Jan. 8, 1946.  T. J. MORAN  2,392,491
COMPOUND RIVET
Filed June 10, 1944
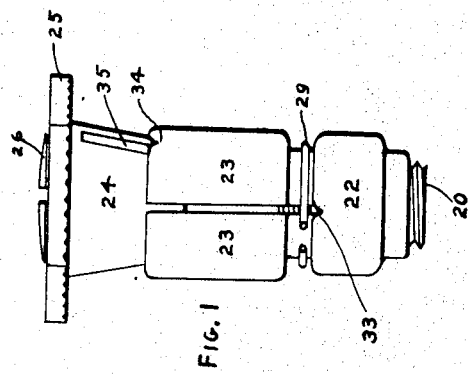
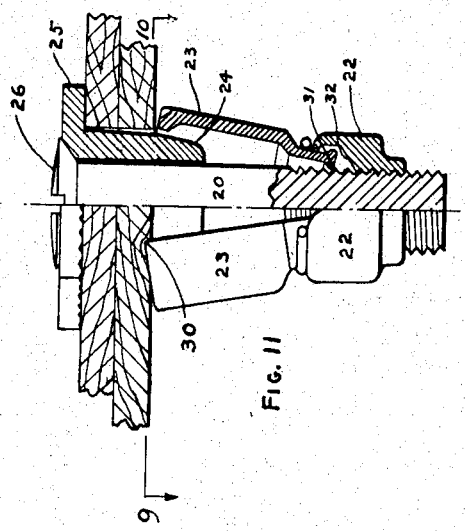
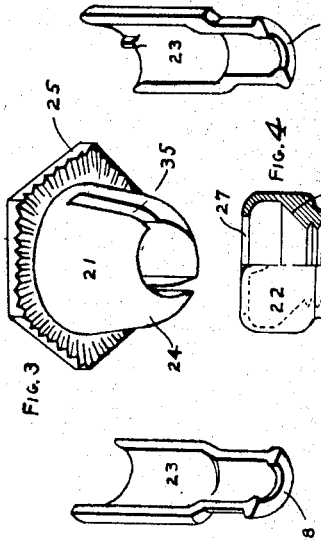
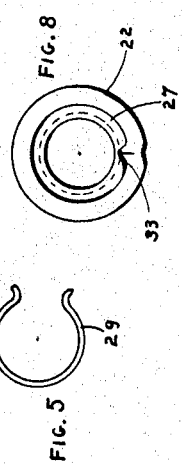
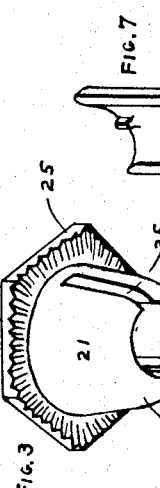
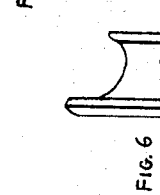
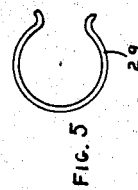
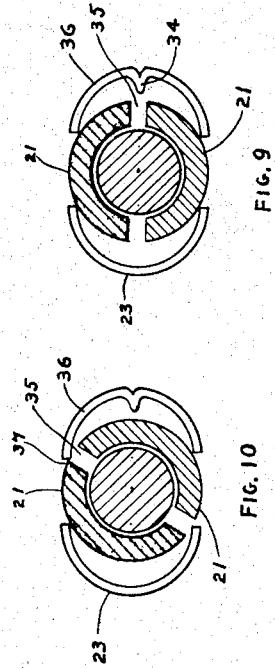
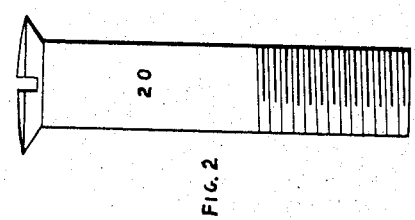
Terence J. Moran INVENTOR.
BY
Emery, Varney, Whittemore & Dix
Attorneys.

Patented Jan. 8, 1946

2,392,491

UNITED STATES PATENT OFFICE 2,392,491

COMPOUND RIVET

Terence J. Moran, Freeport, N. Y., assignor to J. Franklin Perry, Newark, N. J., and Lloyd R. Cutler, Freeport, N. Y.

Application June 10, 1944, Serial No. 539,677

2 Claims. (Cl. 85—2.4)

While, as I shall more particularly point out hereinafter, my invention is applicable to a variety of uses, my principal object has been to provide a means for quickly bonding together two or more thicknesses of material such, for example, as the aluminum sheets of airplane wings, so as to form as effective and permanent a bond therefor as can be produced by riveting or bolting, but with a considerable saving of time and labor. To this and similar ends, my invention provides a unitary device, that is to say, a device which in its completely assembled form can be inserted, like a rivet, through a hole in the material to be bonded and instantly set in clamping position by the workman who inserted it.

In the accompanying drawing, wherein I have illustrated how my invention might be applied as a bonding device, Fig. 1 is a view in elevation of such device in its assembled condition and ready for use; Figs. 2, 3, 4, 5, 6 and 7 are views of the several parts thereof disassembled; Fig. 8 is a plan view of one of these parts, namely, the part shown in elevation (partly in section) in Fig. 4; Figs. 9 and 10 are detail cross sectional views on the plane indicated by the line 9—10 in Fig. 11; and Fig. 11 is a view partly in section and partly in elevation showing the device as it appears in its clamping position.

As shown in the drawing, the component parts of the device are assembled about an ordinary machine screw 20, and comprise in addition to said screw, a collar 21 at the head-end of the screw and through which the screw passes so as to be freely turnable therein, a nut 22 threaded on the other end of the screw, and an expandable sleeve 23 intermediate said collar and nut. The collar has a shank 24 formed with a taper which is embraced by one end of said sleeve, and a flange or shoulder 25 into which the head 26 of the screw may be countersunk, if desired, and which cooperates with the adjacent end of the sleeve, when the latter is expanded, to form a pair of clamping jaws as shown in Fig. 11.

The nut 22 is hollowed out to receive the other end of said sleeve which is passed through a circular opening 27 in said nut, said opening being wide enough to receive and retain the flanged-end 28 of the sleeve but being sufficiently restricted so that when the sleeve is expanded it will bear against the rim of said opening. The sleeve is preferably split longitudinally to provide for its expandability, and its separate parts are constantly urged together by a steel spring 29 embracing a narrowed portion of the sleeve adjacent to the opening 27 in the nut so that the sleeve parts, when free to do so, will cause the sleeve automatically to assume its unexpanded condition.

When these several parts have been assembled in the unitary structure shown in Fig. 1, the thread on the projecting free end of the screw may, if desired, be burred to prevent the nut from accidentally detaching itself from the end of the screw, thus ensuring that the parts will remain in their assembled condition ready to be picked up quickly by a workman for immediate use. When used to clamp together two or more sheets, plates or thicknesses of material, a hole is drilled in the latter of sufficient diameter to admit the nut, sleeve and collar-shank, but not wide enough to pass the flanged shoulder 25 of the collar. Then a screw-driver or other suitable tool is applied to the head of the screw to turn the same so as to draw the nut toward the collar, thus causing the sleeve 23 to expand upon the tapered periphery of the collar-shank as shown in Fig. 11, thereby clamping the sheets or other material tightly together. And, as shown in that same figure, if the expanded ends of the sleeve are formed with sharp edges (indicated at 30) they can be made to bite into the material of the plates or sheets and thus enhance the binding effect of the clamp. Moreover, as will also be seen from Fig. 11, the parts of the sleeve in expanding, bearing as they do against the rim of the opening 27 in the nut, will pivot on the rim, thus causing the ends of the sleeve parts embraced by the nut to bear hard against the threaded shaft of the screw; and if the flanges 31 on these sleeve ends are sharply tapered to fit between adjacent threads of the screw, they will lock the screw from turning, which otherwise might result from shocks or vibrations. To assist in tightly holding these sharpened flanges between the screw threads, the interior surface of the nut opposite the opening 27 may be inclined, as shown at 32 in Figs. 4 and 11, so that in the clamping position of the nut the ends of the sleeve parts within the nut will be contacted by this inclined surface and thus firmly held in position.

To prevent the nut 22 from turning when the screw is operated to draw it toward the collar 21, and vice versa, means are provided to prevent said nut from rotating relatively to said collar. Such means, for example, may comprise a lug and slot connection 33 (Figs. 1 and 8) between the nut and sleeve and a similar connection 34 (Fig. 1) between the sleeve and the collar, except that in the latter case the lug may be shaped, if desired, in the form of a rib to fit the elongated slot 35 (Figs. 1 and 3) in the collar. In the event that when the screw is turned to expand the sleeve, the lugs of these lug and slot connections should not already be in register with their respective slots, a slight turning of the screw will rotate the nut and sleeve to bring the lugs and slots into register. The flange 25 on the collar may be knurled on its inner side as shown in Fig. 3 so that the pressure applied to the head of the screw in turning the same will ordinarily be sufficient to cause said flange to engage the adjacent surface of the material which is being clamped and thus prevent the collar from being turned with the screw. If, however, there should be a tendency for the flange to disengage itself from said material as the clamp is tightened, a wrench may be applied to the flange to hold it stationary, the periphery of the flange being preferably made hexagonal or otherwise suitably shaped for this purpose.

In case, during clamping, the sleeve 23 advances sufficiently upon the tapered surface of the collar-shank 24 to cause the withdrawal of the lug (or rib) 34 from the slot 35 in the shank, as illustrated in Fig. 9, then, provided the nut 22 and sleeve 23 should turn with the screw, this will cause the edge of one of the sleeve parts 36 to abut against the edge of the slot 35, as indicated at 37 in Fig. 10, and thus prevent any further turning of the sleeve and nut.

It will be readily understood, of course, that my improved device, after being put into use as above described, is readily detachable and removable from the material in connection with which it is used, by simply unscrewing the screw whereby the nut will draw the sleeve in the reverse direction and allow the spring to cause the sleeve to collapse thus permitting the ready withdrawal of the device. Hence it may be used over and over again either as a temporary or permanent clamp or fastener. Moreover, it may be used as an expansion bolt for installation in a blind or tunnel type hole to hang gear and the like. Other uses will readily suggest themselves such, for example, as plugging holes in damaged plates on ships, airplanes, pontoons etc., also in the assembly of moldings for the erection of name plates, signs, etc., also for the erection of coat hangers, shelving, window-mullions, or any other objects which it is desired to fasten against a surface, also for the erection of soap dishes and other bathroom fixtures, cable bulkheads, watertight doors, covers for various units, and such other constructions as require the binding action of a screw and nut or bolt.

I claim as my invention:

1. A device of the character described, comprising a screw, a collar on the head-end of the screw having a flange and a shank, a nut threaded on the other end of the screw, an expandable split sleeve intermediate the collar and the nut and provided with means constantly urging the parts of the sleeve together, one end of the sleeve embracing the shank of the collar and the other end being embraced by the nut, means to check the rotation of the collar when the nut is turned, and a flange on the nut-embraced end of the sleeve adapted to engage the threads of the screw when the sleeve is expanded.

2. A device of the character described, comprising a screw, a collar on the head-end of the screw having a flange and a shank, a nut threaded on the other end of the screw, and a expandable split sleeve intermediate the collar and the nut and provided with means constantly urging the parts of the sleeve together, one end of the sleeve embracing the shank and the collar and the other end being embraced by the nut, one face of the nut having a restricted opening to receive the end of the sleeve which bears against and pivots upon the rim of said opening, and said nut having an inclined interior surface adapted to bear against the end of the sleeve to hold said end in tight engagement with the threads of the screw when the sleeve is expanded.

TERENCE J. MORAN.